United States Patent
Cregg et al.

(10) Patent No.: US 9,628,422 B2
(45) Date of Patent: Apr. 18, 2017

(54) ACKNOWLEDGEMENT AS A PROPAGATION OF MESSAGES IN A SIMULCAST MESH NETWORK

(71) Applicant: SmartLabs, Inc., Irvine, CA (US)

(72) Inventors: Daniel Brian Cregg, Newport Beach, CA (US); Joseph J. Dada, III, Newport Beach, CA (US)

(73) Assignee: SmartLabs, Inc., Irvine, CA (US)

( * ) Notice: Subject to any disclaimer, the term of this patent is extended or adjusted under 35 U.S.C. 154(b) by 0 days.

(21) Appl. No.: 15/069,279

(22) Filed: Mar. 14, 2016

(65) Prior Publication Data

US 2016/0261538 A1   Sep. 8, 2016

Related U.S. Application Data

(63) Continuation of application No. 13/941,392, filed on Jul. 12, 2013, now Pat. No. 9,300,484.

(51) Int. Cl.
*G06F 15/16* (2006.01)
*H04L 12/58* (2006.01)
*H04L 12/18* (2006.01)

(52) U.S. Cl.
CPC .............. *H04L 51/18* (2013.01); *H04L 12/18* (2013.01); *H04L 12/1868* (2013.01)

(58) Field of Classification Search
CPC ...... H04L 51/18; H04L 12/18; H04L 12/1868
USPC ........................................................ 709/204
See application file for complete search history.

(56) References Cited

U.S. PATENT DOCUMENTS

| | | |
|---|---|---|
| 5,090,024 A | 2/1992 | Vander Mey et al. |
| 5,148,159 A | 9/1992 | Clark et al. |
| 5,288,981 A | 2/1994 | Davis |
| 5,726,644 A | 3/1998 | Jednacz et al. |
| 5,754,754 A | 5/1998 | Dudley et al. |
| 6,031,818 A | 2/2000 | Lo et al. |
| 6,526,506 B1 | 2/2003 | Lewis |

(Continued)

FOREIGN PATENT DOCUMENTS

| | | |
|---|---|---|
| CN | 101833802 B | 1/2012 |
| KR | 2006096558 A | 9/2006 |

(Continued)

OTHER PUBLICATIONS

Insteon—White Paper: The Details, INSTEON, 2013.

(Continued)

*Primary Examiner* — Melvin H Pollack
(74) *Attorney, Agent, or Firm* — Knobbe, Martens, Olson & Bear, LLP

(57) ABSTRACT

The presently described apparatus and method extends the capabilities of an Insteon network of devices. The method includes transmitting a group command message from a first device to a selected group of devices having a common group number, and receiving the group command message by a second device of the group or receiving a clean-up message transmitted by the first device, and resetting the state of the second one of the devices, and transmitting an acknowledgement message to the first devices from the second device, and receiving the first acknowledgement message by a third one of the devices that had not received the group command message or a clean-up message previously, and restoring the state of the third one of the devices.

20 Claims, 8 Drawing Sheets

(56) References Cited

U.S. PATENT DOCUMENTS

| | | | |
|---|---|---|---|
| 6,636,488 | B1 | 10/2003 | Varma |
| 6,693,907 | B1 | 2/2004 | Wesley et al. |
| 6,734,784 | B1 | 5/2004 | Lester |
| 6,918,077 | B2 | 7/2005 | Fukushima et al. |
| 7,034,899 | B2 | 4/2006 | Symoen et al. |
| 7,046,642 | B1 | 5/2006 | Cheng et al. |
| 7,050,789 | B2 | 5/2006 | Kallio et al. |
| 7,069,490 | B2 | 6/2006 | Niu et al. |
| 7,102,502 | B2 | 9/2006 | Autret |
| 7,233,573 | B2 | 6/2007 | Walls et al. |
| 7,286,511 | B2 | 10/2007 | Zhong et al. |
| 7,345,998 | B2 | 3/2008 | Cregg et al. |
| 7,494,106 | B2 | 2/2009 | Mathis |
| 7,528,716 | B2 | 5/2009 | Jackson |
| 7,663,502 | B2 | 2/2010 | Breed |
| 7,755,505 | B2 | 7/2010 | Johnson et al. |
| 7,872,423 | B2 | 1/2011 | Biery et al. |
| 7,904,187 | B2 | 3/2011 | Hoffberg |
| 8,013,545 | B2 | 9/2011 | Jonsson |
| 8,081,649 | B2 | 12/2011 | Cregg et al. |
| 8,190,275 | B2 | 5/2012 | Change |
| 8,223,783 | B2 | 7/2012 | Shorty et al. |
| 8,230,466 | B2 | 7/2012 | Cockrell et al. |
| 8,285,326 | B2 | 10/2012 | Carmody et al. |
| 8,301,180 | B1 | 10/2012 | Gailloux |
| 8,331,544 | B2 | 12/2012 | Kraus et al. |
| 8,332,495 | B2 | 12/2012 | Lancaster et al. |
| 8,358,197 | B2 | 1/2013 | Tran |
| 8,427,076 | B2 | 4/2013 | Bourquin et al. |
| 8,495,244 | B2 | 7/2013 | Bonar |
| 8,516,087 | B2 | 8/2013 | Wilson |
| 8,558,697 | B2 | 10/2013 | Clough |
| 8,610,305 | B2 | 12/2013 | Sarid |
| 8,619,819 | B2 | 12/2013 | Seelman |
| 8,630,741 | B1 | 1/2014 | Matsuoka et al. |
| 8,653,935 | B2 | 2/2014 | Baker |
| 8,804,584 | B2* | 8/2014 | Stewart ............... H04W 40/026 370/311 |
| 8,918,461 | B2* | 12/2014 | Rimmer ............. G08B 21/0415 709/204 |
| 8,935,533 | B2* | 1/2015 | Kim ..................... H04L 9/0844 713/181 |
| 9,014,067 | B2 | 4/2015 | Chun |
| 9,014,708 | B2* | 4/2015 | He ......................... H04W 8/26 455/450 |
| 9,054,892 | B2 | 6/2015 | Lamb |
| 9,054,961 | B1 | 6/2015 | Kim et al. |
| 9,071,453 | B2 | 6/2015 | Shoemaker |
| 9,078,087 | B2 | 7/2015 | Yoon |
| 9,081,501 | B2 | 7/2015 | Asaad et al. |
| 9,094,224 | B2* | 7/2015 | Olofsson ............ H04L 12/1868 |
| 9,143,962 | B2 | 9/2015 | Brady |
| 9,148,443 | B2 | 9/2015 | Chizeck |
| 9,155,153 | B1 | 10/2015 | Cregg et al. |
| 9,232,615 | B2 | 1/2016 | Cregg et al. |
| 9,251,700 | B2 | 2/2016 | Cregg et al. |
| 9,300,484 | B1 | 3/2016 | Cregg et al. |
| 9,317,984 | B2 | 4/2016 | Cregg et al. |
| 9,324,203 | B2 | 4/2016 | Cregg et al. |
| 9,347,242 | B2 | 5/2016 | Cregg et al. |
| 9,361,786 | B2 | 6/2016 | Cregg et al. |
| 9,426,220 | B2* | 8/2016 | Chauhan ............ H04L 67/1097 |
| 9,485,677 | B2* | 11/2016 | Lightstone ........... H04W 24/06 |
| 2002/0087685 | A1 | 7/2002 | Lassen et al. |
| 2002/0146993 | A1 | 10/2002 | Persico et al. |
| 2002/0161990 | A1 | 10/2002 | Zhang et al. |
| 2003/0098777 | A1 | 5/2003 | Taylor et al. |
| 2003/0103521 | A1 | 6/2003 | Raphaeli et al. |
| 2003/0142685 | A1 | 7/2003 | Bare |
| 2003/0198938 | A1 | 10/2003 | Murray |
| 2004/0030887 | A1 | 2/2004 | Harrisville-Wolff et al. |
| 2004/0131125 | A1 | 7/2004 | Sanderford et al. |
| 2004/0142685 | A1 | 7/2004 | Glasser et al. |
| 2004/0160306 | A1 | 8/2004 | Stilp |
| 2004/0243684 | A1 | 12/2004 | Ha et al. |
| 2005/0104730 | A1 | 5/2005 | Yang |
| 2005/0117747 | A1 | 6/2005 | Valenti et al. |
| 2006/0126617 | A1 | 6/2006 | Cregg et al. |
| 2006/0164206 | A1 | 7/2006 | Buckingham et al. |
| 2006/0174102 | A1 | 8/2006 | Smith et al. |
| 2006/0185799 | A1 | 8/2006 | Kates |
| 2006/0196926 | A1 | 9/2006 | Benson et al. |
| 2006/0210278 | A1 | 9/2006 | Cregg et al. |
| 2006/0250745 | A1 | 11/2006 | Butler et al. |
| 2006/0250980 | A1 | 11/2006 | Pereira et al. |
| 2007/0007898 | A1 | 1/2007 | Bruning |
| 2007/0162536 | A1 | 7/2007 | Ostrovsky et al. |
| 2007/0260558 | A1 | 11/2007 | Look |
| 2007/0290793 | A1 | 12/2007 | Tran |
| 2008/0037792 | A1 | 2/2008 | Becker et al. |
| 2008/0065884 | A1 | 3/2008 | Emeott et al. |
| 2008/0106241 | A1 | 5/2008 | Deaver et al. |
| 2008/0130673 | A1 | 6/2008 | Cregg et al. |
| 2008/0175386 | A1 | 7/2008 | Bestermann |
| 2008/0309504 | A1 | 12/2008 | Lim |
| 2009/0022151 | A1 | 1/2009 | Jeon et al. |
| 2009/0051528 | A1 | 2/2009 | Graichen |
| 2009/0102682 | A1 | 4/2009 | Corndorf |
| 2009/0171571 | A1 | 7/2009 | Son et al. |
| 2010/0005166 | A1 | 1/2010 | Chung |
| 2010/0121968 | A1 | 5/2010 | Clark |
| 2010/0277286 | A1 | 11/2010 | Burkart et al. |
| 2010/0283579 | A1 | 11/2010 | Kraus et al. |
| 2010/0289643 | A1 | 11/2010 | Trundle et al. |
| 2011/0051721 | A1 | 3/2011 | Brothwell et al. |
| 2011/0109433 | A1 | 5/2011 | Kuenzi et al. |
| 2011/0133655 | A1 | 6/2011 | Recker et al. |
| 2011/0187275 | A1 | 8/2011 | Giltaca et al. |
| 2012/0082461 | A1 | 4/2012 | Meyer et al. |
| 2012/0084364 | A1 | 4/2012 | Sivavakeesar |
| 2012/0249013 | A1 | 10/2012 | Valois et al. |
| 2012/0253535 | A1 | 10/2012 | Newman, Jr. et al. |
| 2012/0286673 | A1 | 11/2012 | Holland et al. |
| 2012/0299314 | A1 | 11/2012 | Jiang |
| 2013/0008958 | A1 | 1/2013 | Smith et al. |
| 2013/0069542 | A1 | 3/2013 | Curasi et al. |
| 2013/0090744 | A1 | 4/2013 | Tran |
| 2013/0124883 | A1 | 5/2013 | Addepalli et al. |
| 2013/0173811 | A1 | 7/2013 | Ha et al. |
| 2013/0176107 | A1 | 7/2013 | Dumas et al. |
| 2013/0192316 | A1 | 8/2013 | McKibben et al. |
| 2013/0201009 | A1 | 8/2013 | Lin et al. |
| 2013/0237193 | A1 | 9/2013 | Dumas et al. |
| 2013/0246543 | A1 | 9/2013 | Pasek |
| 2013/0261821 | A1 | 10/2013 | Lu et al. |
| 2013/0266140 | A1 | 10/2013 | Wall et al. |
| 2013/0293118 | A1 | 11/2013 | Nagashima et al. |
| 2014/0001977 | A1 | 1/2014 | Zacharchuk et al. |
| 2014/0022061 | A1 | 1/2014 | Apte |
| 2014/0129606 | A1 | 5/2014 | Cate et al. |
| 2014/0167618 | A1 | 6/2014 | Wang |
| 2014/0180487 | A1 | 6/2014 | Bull |
| 2014/0192912 | A1 | 7/2014 | Chappel et al. |
| 2014/0207707 | A1 | 7/2014 | Na et al. |
| 2014/0219193 | A1 | 8/2014 | Linde |
| 2014/0269425 | A1 | 9/2014 | Fisher |
| 2014/0280398 | A1 | 9/2014 | Smith et al. |
| 2014/0321268 | A1 | 10/2014 | Saltsidis |
| 2015/0019659 | A1* | 1/2015 | Eidelson ................ H04L 51/32 709/206 |
| 2015/0035437 | A1 | 2/2015 | Panopoulos et al. |
| 2015/0039740 | A1 | 2/2015 | Yamada |
| 2015/0082033 | A1 | 3/2015 | Bruce et al. |
| 2015/0085845 | A1 | 3/2015 | Wang et al. |
| 2015/0092545 | A1 | 4/2015 | Katar et al. |
| 2015/0097663 | A1 | 4/2015 | Sloo et al. |
| 2015/0116097 | A1 | 4/2015 | Cregg et al. |
| 2015/0120000 | A1 | 4/2015 | Coffey et al. |
| 2015/0130276 | A1 | 5/2015 | Mceill-McCallum et al. |
| 2015/0160626 | A1 | 6/2015 | Cregg et al. |
| 2015/0161884 | A1 | 6/2015 | Cregg et al. |
| 2015/0280994 | A1 | 10/2015 | Kim et al. |
| 2015/0295949 | A1 | 10/2015 | Chizeck et al. |
| 2015/0296599 | A1 | 10/2015 | Recker et al. |

(56) References Cited

U.S. PATENT DOCUMENTS

| | | |
|---|---|---|
| 2016/0027262 A1 | 1/2016 | Skotty et al. |
| 2016/0044719 A1 | 2/2016 | Sidhu et al. |
| 2016/0080080 A1 | 3/2016 | Cregg et al. |
| 2016/0104375 A1 | 4/2016 | Cregg et al. |
| 2016/0134470 A1 | 5/2016 | Cregg |
| 2016/0134603 A1 | 5/2016 | Cregg |
| 2016/0134604 A1 | 5/2016 | Cregg |
| 2016/0134605 A1 | 5/2016 | Cregg |
| 2016/0134632 A1 | 5/2016 | Cregg |
| 2016/0134640 A1 | 5/2016 | Cregg |
| 2016/0157325 A1 | 6/2016 | Cregg |

FOREIGN PATENT DOCUMENTS

| | | |
|---|---|---|
| KR | 101034957 81 | 5/2011 |
| KR | 1020120105614 A | 9/2012 |
| WO | WO 2006/065275 | 6/2006 |
| WO | WO 2010/140136 | 12/2010 |
| WO | WO 2014/007981 | 1/2014 |

OTHER PUBLICATIONS

Perez, 802.11i—How we got here and where are we headed, SANS Institute, 2004.
"Refresh! INSTEON Technology," Electronic Design (EE) Product News, Staff Article, Apr. 5, 2006.
PCT International Search Report and Written Opinion for PCT/US2013/046396 dated Nov. 21, 2013, 11 pages.
PCT International Written Opinion for PCT/US2013/046396 dated Jun. 26, 2014, 7 pages.
PCT International Preliminary Report on Patentability for PCT/US2013/046396 dated Oct. 8, 2014, in 6 pages.
Malaysian Notice of Allowance, re MY Application No. PI 2012003571, dated Apr. 15, 2016.

* cited by examiner

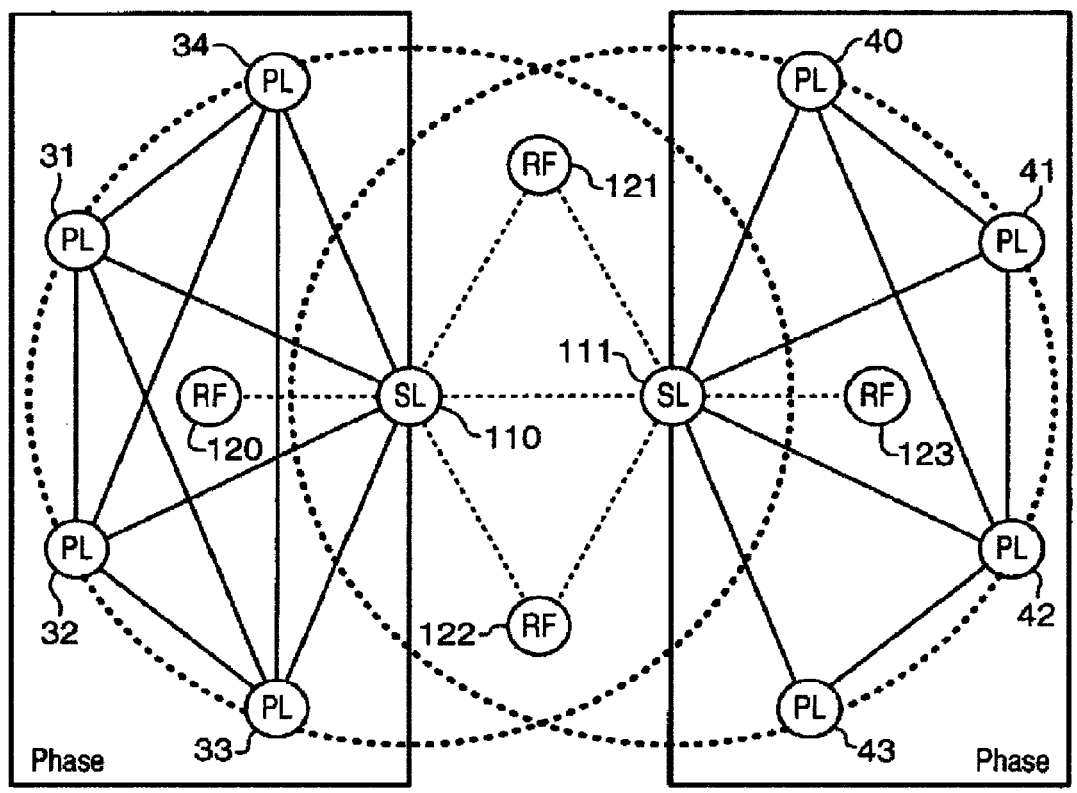
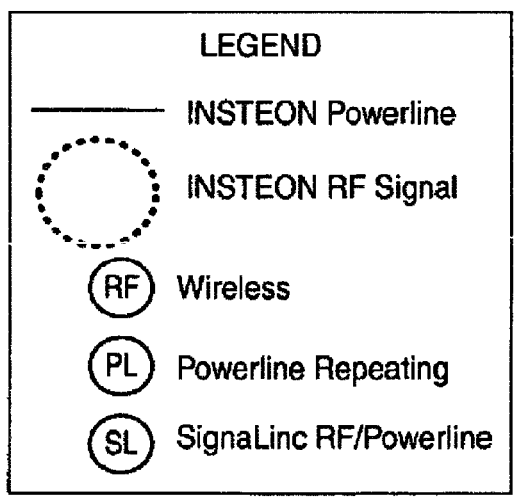
FIG. 1

| Group Clean-up Direct Message – 10 Bytes ||||| 
|---|---|---|---|---|
| 3 Bytes | 3 Bytes | 1 Byte | 2 Bytes | 1 Byte |
| Originator Address | Device Address from Originators database | Direct message with optimal hops | Same Command as initial Group Broadcast and Group number | CRC³ |

| Data | | Bits | Contents |
|---|---|---|---|
| Originator Address | | 24 | Message Originator's address |
| Recipient Address | | 24 | Intended recipient based on Originator's local database group list |
| Message Flags | Message Type | 3 | Set to 010b for indication of Group Clean-up message type |
| | Size Flag | 1 | 0 (Zero) for Standard messages |
| | Hops Left | 2 | Initially set to 3 (11b), then to 3 - value of last message received from intended recipient. Decremented as message is repeated. |
| | Max Hops | 2 | Initially set to 3 (11b), then to 3 - value of last message received from intended recipient. |
| Command 1 | | 8 | Typically 0x11 - Command to execute |
| Command 2 | | 8 | Group number |
| CRC | | 8 | Cyclic Redundancy Check |

FIG. 2

| Acknowledgement Message – 10 Bytes |||||
|---|---|---|---|---|
| 3 Bytes | 3 Bytes | 1 Byte | 2 Bytes | 1 Byte |
| From recipient | To Group Originator | Group Clean-up Direct message acknowledgement with optimal hops | Same Command and Group number and as initial Group Broadcast | CRC<sup>Error! Reference source not found.</sup> |

*The number of hops used for this message will correspond to either a maximum of 3, or to the hops used for the last message received from the intended recipient. (3 minus remaining hop count when received)

| Data | | Bits | Contents |
|---|---|---|---|
| Recipient Address (now acting as the originating transmitter) || 24 | Message Originator's address |
| Originator Address (now the intended target of the message) || 24 | Intended recipient based on Originator's local database group |
| Message Flags | Message Type | 3 | Set to 011b for indication of Group Clean-up Acknowledgement message type |
| | Size Flag | 1 | 0 (Zero) for Standard messages |
| | Hops Left | 2 | Initially set to 3 (11b), then to 3 - value of last message received from intended recipient. Decremented as message is repeated. |
| | Max Hops | 2 | Initially set to 3 (11b), then to 3 - value of last message received from intended recipient. |
| Command 1 || 8 | Typically 0x11 |
| Command 2 || 8 | Group number |
| CRC || 8 | Cyclic Redundancy Check |

FIG. 3

INSTEON MESSAGE STRUCTURE

| Bit Position | Flag | Meaning |
|---|---|---|
| Bit 7 (Broadcast /NAK) (MSB) | Message Type | 100 = Broadcast Message<br><br>000 = Direct Message<br>001 = ACK of Direct Message<br>101 = NAK of Direct Message<br><br>110 = Group Broadcast Message<br>010 = Group Cleanup Direct Message<br>011 = ACK of Group Cleanup Direct Message<br>111 = NAK of Group Cleanup Direct Message |
| Bit 6 (Group) | | |
| Bit 5 (Acknowledge) | | |
| Bit 4 | Extended | 1 = Extended Message<br>0 = Standard Message |
| Bit 3 | Hops Left | 00 = 0 message retransmissions remaining<br>01 = 1 message retransmission remaining<br>10 = 2 message retransmissions remaining<br>11 = 3 message retransmissions remaining |
| Bit 2 | | |
| Bit 1 | Max Hops | 00 = Do not retransmit this message<br>01 = Retransmit this message 1 time maximum<br>10 = Retransmit this message 2 times maximum<br>11 = Retransmit this message 3 times maximum |

FIG. 4

ACKNOWLEDGEMENT AS A PROPAGATION OF MESSAGES IN A SIMULCAST MESH NETWORK

BACKGROUND

The industrial field of this disclosure relates to wired and wireless communications and in particular to the Insteon® network. The Insteon network and protocol are disclosed in U.S. Pat. No. 8,081,649. In general, an Insteon system is able to propagate radio frequency (RF) and power line transmissions over extended distances at relatively low power. Such a network consists of a number of spatially separated transceiver devices and processor based software protocols requiring each device to retransmit a received transmission, usually more than once. The retransmissions are simultaneously sent out by all devices that have received the original transmission. In this manner, an original transmission is able to propagate by hops from one device to the next so that a distant device, although not able to receive the original transmission may be able to receive a retransmission. When the number of retransmissions is more than one, the probability of the most distant device receiving a message is increased so that with a large network operating with multiple retransmissions, even the most distant device may be able to receive the originally transmitted message. However, because of RF transmission interference, low transmission power, power line noise, power line phase incompatibilities and other problems there is a need for improved methods to assure full transmission reception over the entire network.

The complexity of a mesh network of devices is significantly reduced based on distributed intelligence allowing all devices to simultaneously respond to a generic input with each executing a unique or specific local response. Other networks use a series of specific commands each directed to a particular device from a central controller. This limits scalability of the network due to eventual delays as the network increases in size.

BRIEF SUMMARY AND OBJECTIVES

The presently described extension of the Insteon network technology and its operating protocol provides for improved operations in meeting the primary objective of the network, which is to assure that all designated devices (devices) receive an intended transmission, or at least a notice that such transmission has occurred. As defined in U.S. Pat. No. 8,081,649 an original transmission is received by Insteon devices in the network that are within range and is retransmitted so that when multiple retransmissions occur the probability of remote devices receiving a message incorporated in an original transmission is high. However, experience has shown that for the reasons described above, some intended recipients of the original transmission may not receive it. The presently described improvement on the Insteon protocol provides a further assurance of fully completing a transmission-reception cycle to all designated or targeted devices within the network.

The present Insteon protocol includes acquiring acknowledgements from each member of a targeted group to which an original transmission is sent. Presently, when one member of the group does not acknowledge, expensive remedial steps must be taken such as a physical inspection of the errant device. However, when a group comprises a plurality of members, if the errant member receives an acknowledgement transmission sent by another member of the same group, the errant member is able to recognize that an original transmission was sent and then is able to transmit its own acknowledgement as well as take a required action. This improved protocol has significant advantages and may provide cost and time savings in the management of the network. Therefore, each acknowledgement transmission from a group member serves two purposes; first to inform the original transmitter device that the group member did receive the original transmission and took a designated action, and second, to further inform other members of the same group that the original transmission did in fact occur so that they may take action as well. Other benefits of this extension to the Insteon protocol will be identified in the following detailed description.

BRIEF DESCRIPTION OF THE DRAWINGS

FIG. 1 is an example block diagram of a network of Insteon modules in mutual communication;

FIG. 2 is an example chart showing a breakdown and byte assignment of a Group Clean-up Direct message and data stored in the message of the disclosed method;

FIG. 3 is an example chart showing a breakdown and byte assignment of an Acknowledgement Message and data stored in the message of the disclosed method;

FIG. 4 is an example chart showing a typical Insteon message structure;

DETAILED DESCRIPTION

Figure 5:
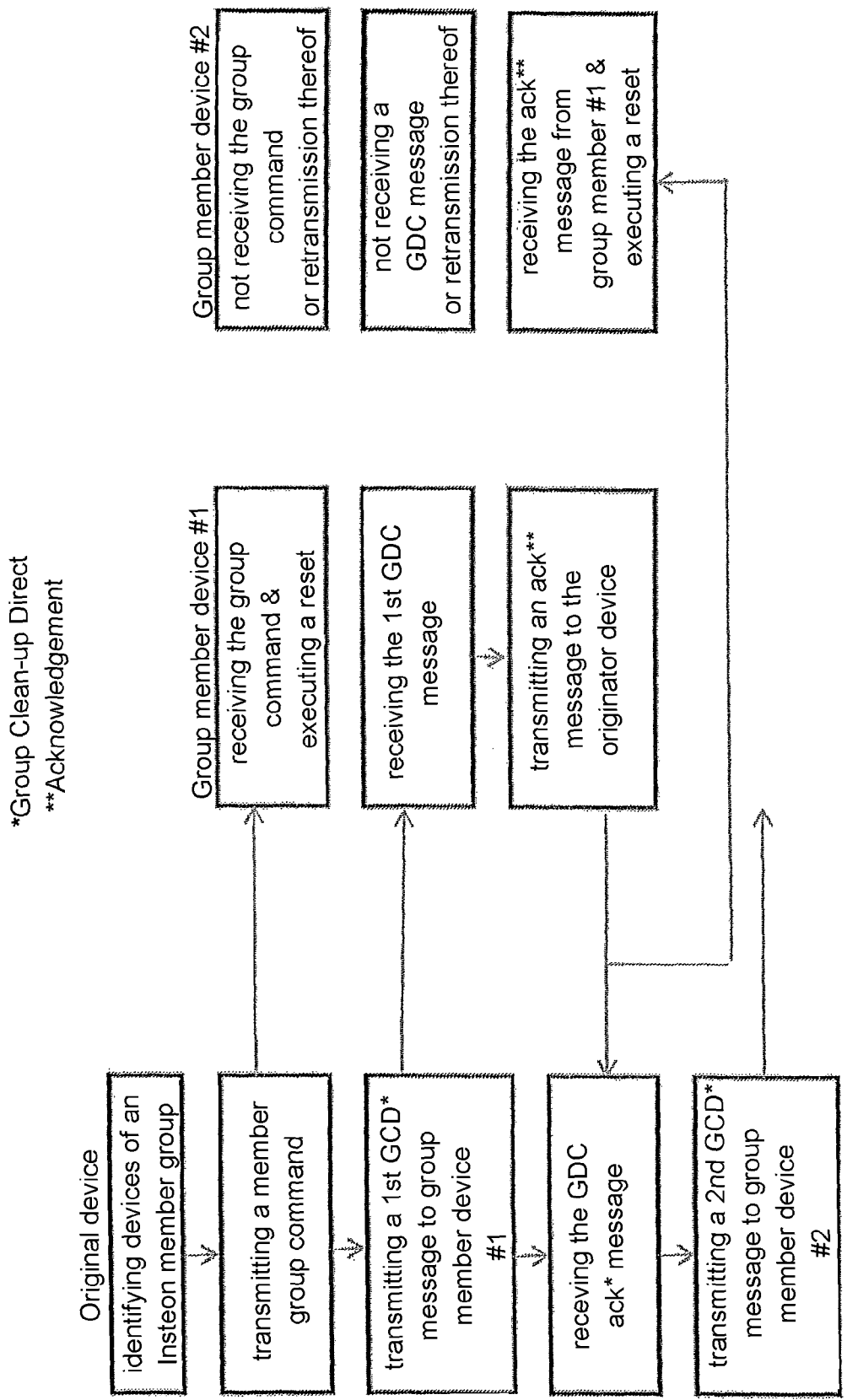
FIG. 5 is an example block diagram defining the disclosed method.

As defined in U.S. Pat. No. 8,081,649 which is incorporated herein by reference in its entirety, a network of spatially separated Insteon® modules ("devices" herein) are able to communicate by electrical or optical transmission means with each other so that they may be used to relay messages to intended recipients although such recipients are not able to directly receive a transmission from a particular device. FIG. 1 is an example of such a network as previously described in the '649 patent and shows how multiple Insteon devices, each of which is capable of repeating transmissions, form a reliable communications network. In FIG. 1 devices 110 and 111, are capable of both power line and radio frequency (RF) communications. Devices 120, 121, 122, and 123 are only capable of RF communications. The remaining devices: 31, 32, 33, 34 and 40, 41, 42, 43, are only capable of power line communications. Every device is capable of repeating received transmissions, using the Insteon protocol according to the '649 patent. Adding more devices increases the number of available pathways for messages to travel. Path diversity results in a higher probability that a particular transmission will arrive at its intended destination, so the more devices in a network the more reliable it tends to be.

This relaying process will occur when each of the devices is set to automatically retransmit a received transmission even though a given device is not the intended target. Such retransmissions can result in transmission hops over a significant distance to reach an intended remote device even using relatively low transmission power. The '649 patent details the equipment, system arrangement, message structure and software automation that is necessary to accomplish this desirable outcome. One aspect of the Insteon network and its intended objectives is to assure that transmissions are, in fact, received by all targeted devices. Therefore after a transmission is sent to all network devices or to an identified sub-group of the network, the originating device transmits an invitation to each of the targeted devices in turn to send back an acknowledgement transmission. Failing to receive an acknowledgement after one or more additional attempts may well initiate remedial action which may incur expense.

In the Insteon network the spatially separated devices are able to be in mutual communication by at least one of wired and wireless means. Each device has a data processor, a memory device, a transceiver, and a digital instruction set, which is stored within the memory device and which enables a protocol for processing messages that are received, and for compiling and transmitting messages as well.

A plurality of the devices may be present in a transmission space which may, for instance, include the interior of a building or other structure. The present method involves the transmission of information between the devices and includes a specific sequence of steps. As described, communications may be carried out via power line transmissions, radio frequency transmissions, or through other means and may include simultaneous transmissions via multiple means. The set of possible transmission means is referred to herein as "the channel."

FIGS. 2, 3, and 4 define the nature and specific details of the messages that are included in the present method. FIG. 4 is a general outline of the message structure. A primary message targeted to one or more members of a selected group of the devices is transmitted by a device referred to herein as an "originator device," see FIG. 5. Other devices in the transmission space, such as the 1st group member and the 2nd group member shown in FIG. 5 may receive the primary message and then may retransmit it. The information in the primary message causes group members to take an action such as restoring to a pre-determined or initial or previous state. Devices that are not targeted group members may ignore the information. Because of the potentially large number of simultaneous retransmissions, there is a high probability that the primary message will reach all of its targeted group members.

To assure that the primary message has reached all of its targeted group members, the originator device transmits a series of secondary messages, one at a time in sequence; each targeted to only a selected one of the group members of the target group. Each secondary message, as before, is received by the other devices and is then retransmitted. The secondary message is referred to as a Group Clean-up Direct message and is intended to both confirm and re-enforce the original intention of the primary message. FIG. 2 shows a breakdown of an example of the information in such a message.

All other devices that receive and repeat the secondary message have the additional opportunity to interrogate the secondary message for relevance to information stored in their own databases. The information carried by both the primary message and the secondary message contains the address, and the group number of the originator device as well as a command; see commend 1 in FIG. 2. Each group member may therefore execute the received command and change its state to match values that are stored in its own database. Primary, secondary, and repeated messages typically occur at different times so that transient noise in the channel does not present a problem. The repeating of messages by the other devices increases the likelihood of all group members successfully receiving the primary and the secondary messages.

Upon receipt of a Group Clean-up Direct message (FIG. 2), a targeted group member responds by transmitting an acknowledgement message (FIG. 3) in the next message time slot when the channel is clear. When the originator device receives an acknowledgement message from a targeted group member, or alternately has reached a predetermined maximum number of retransmissions without receiving a corresponding acknowledgement message, it proceeds to the next group member in its memory. Information about each group member of a targeted group is stored in memory and includes the addresses of the group members as well as other information. FIG. 3 shows a breakdown of an example of the information in an acknowledgement message as transmitted by a group member after having received a secondary message from the originator device or a retransmission of the secondary message from any one of the other devices.

A group member may receive the Group Clean-up Direct message directly from the originator device as transmitted by the originator device, or from one or more of the other devices including other members of the same group, as a retransmission of the Group Clean-up Direct message. Furthermore, the group member may receive a transmitted acknowledgement message transmitted by any member of the same group. In certain cases, the group member will act to execute the command and transmit an acknowledgement message. The acknowledgement messages may be received directly by the originator device as transmitted by the group members, or may receive the acknowledgement message as retransmitted by one or more of the other devices.

Figure 6A:
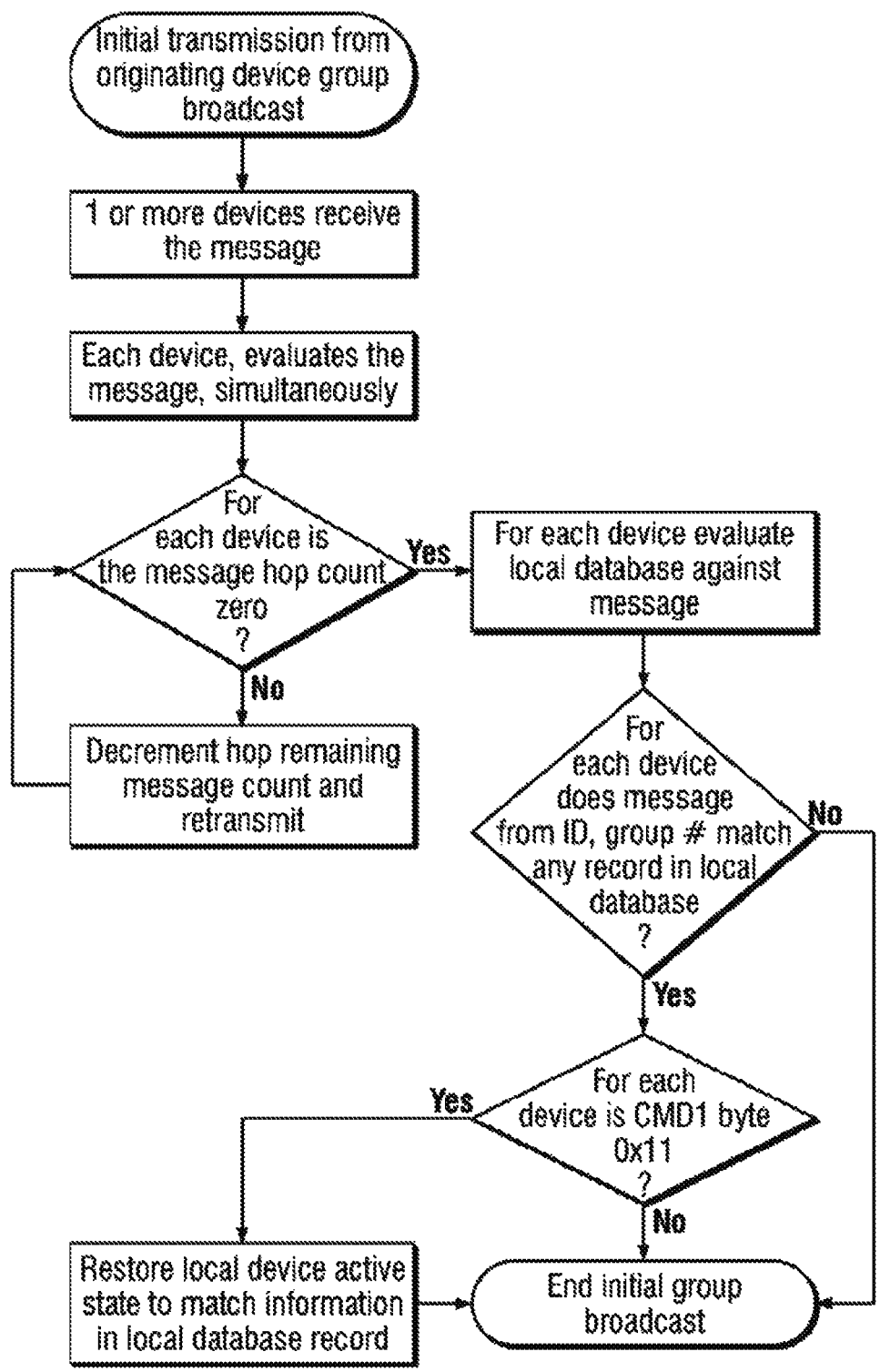
FIG. 6A is a logic flow diagram showing the process by which the method is conducted.
Figure 6B:
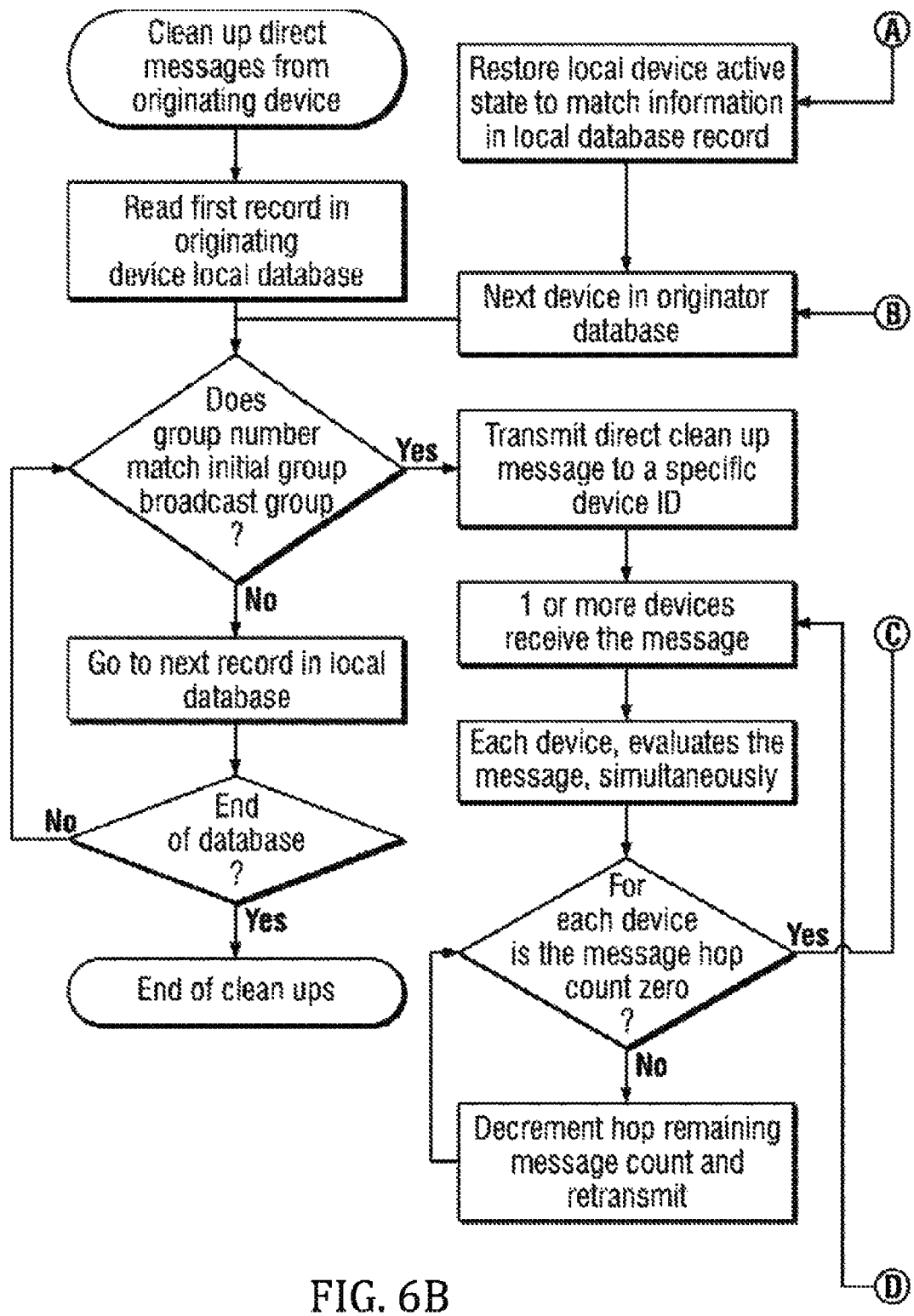
FIG. 6B is the first portion of a further logic flow diagram showing the process by which the method is conducted.
Figure 6C:
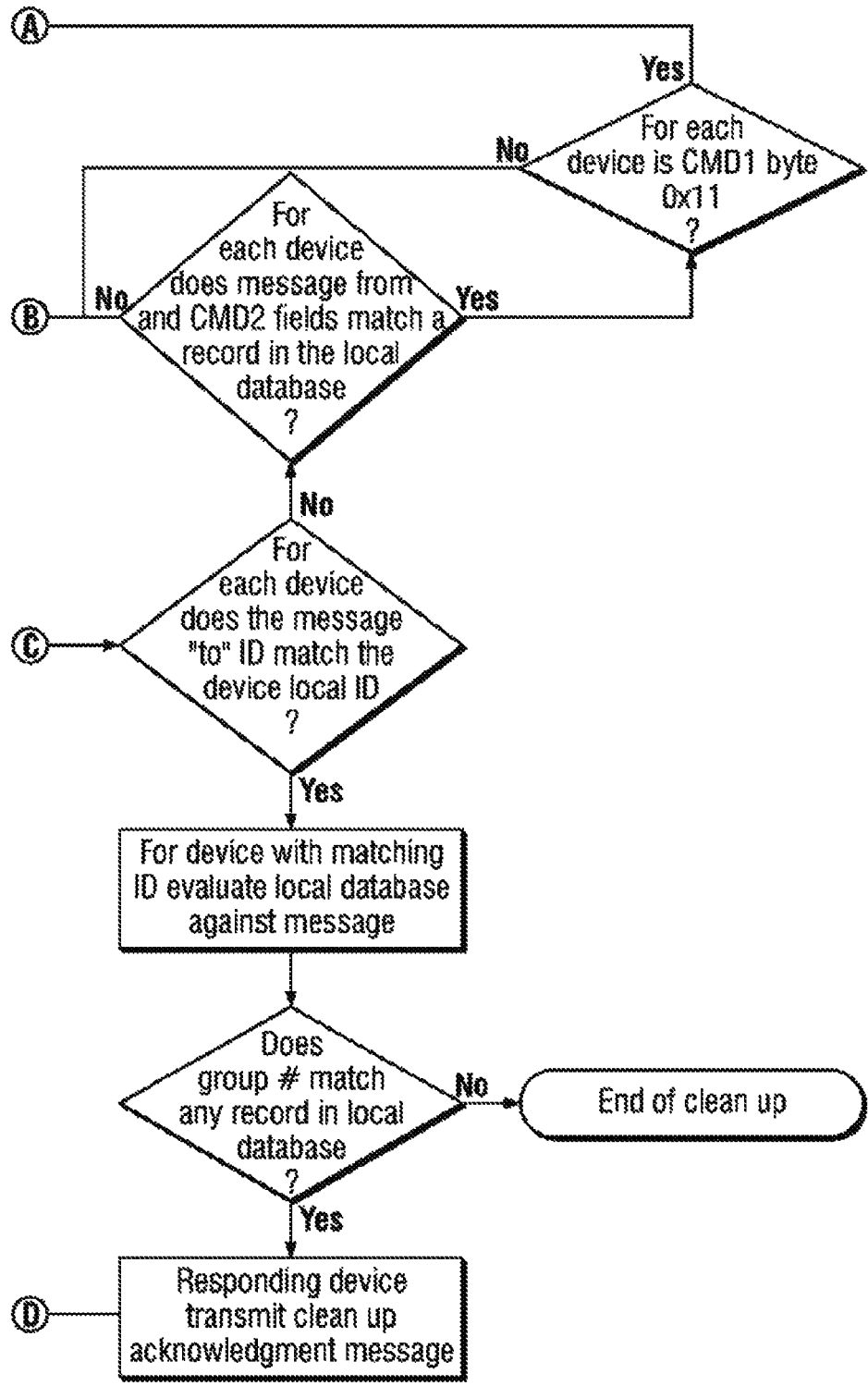
FIG. 6C is a second portion of the further logic flow diagram of FIG. 6B.

All devices repeating the Group Clean-up acknowledgement message transmitted by a group member have the additional opportunity to interrogate the message for relevance to information stored in memory. Since the message being repeated contains information including the address of the originator device, group number, and command; a comparison of this information with information stored in memory, can, based on an information match, cause the execution of a change in state to match values stored in memory. Since an acknowledgement message may originate from a different physical location than the precursor Group Clean-up Direct message, there is an opportunity for group members that do not receive the Group Clean-up Direct message to receive another group member's acknowledgement message. Also, since the occurrence in time is different between a Group Clean-up Direct message and an acknowledgement message, transient noise in the channel is typically not a hindrance to the reception of messages. The logical flow diagram of FIG. 6 defines an example of the processing of information in the channel by the originator device and the group devices in executing the present method. The usage of the term "command" that is delivered by a received message may take the meaning of; to execute a delivered instruction, or may alternately take the meaning of: to merely execute an instruction already in memory of the device receiving the message.

The present method of transmitting information between devices in a network of said devices operates through a communication channel which may use radio frequency transmissions, modulation on power lines and other means. The method includes transmitting a command message from an originator device to a first group of member devices of the network of devices where the member devices all have the same group number, see "Command 2" under "Data" in FIG. 3. Further, all of the member devices are programmed to resume a memory stored state when receiving a message with 0X11, see "Command 1," that is, a restore is executed. The number of devices in the first group may be any quantity including two or more. The originator device will have the same group number as all of the devices in the first group. Not all of the member devices of the first group may receive the command message so that those that do (the second group of devices), can be equal to or less than, in number, relative to the first group of devices. The devices of the second group will restore their status. As previously noted, a clean-up message is transmitted to each one of the devices in the first group, but since not all of these devices will receive the clean-up message, only those devices that do receive the clean-up message will respond with an acknowledgement message and this group of responders comprises a third group of devices that will respond by transmitting, each one in turn, an acknowledgement message to the originator device. The fourth group of devices is represented by those devices that are members of the group of devices that were sent clean-up messages, but did not receive either the original command broadcast or the clean-up messages or any repeated transmissions of these messages, but did receive an acknowledgement transmitted from any other member of the original group of member devices or hops therefrom. This added opportunity to receive a transmission carrying the group number and 0X11 Command 1 provides an important improvement in the Insteon protocol for improved message communication.

It should be clear that the second group and the third group may be equal in number or one may be larger than the other. From the foregoing we know that the groups may be represented as follows: GU, G1, G2, G3 and G4, where:

GU=the entire network of devices (universal group)
G1=all devices having the same group number and originator ID (G1<GU)
G2=all G1 devices receiving the command message (G2<G1)
G3=all G1 devices receiving the clean-up message (G3<G1) (G3<=>G2)
G4=non-members of G2 receiving G3 acknowledgements (G4<G3)

Embodiments of the subject apparatus and method have been described herein. Nevertheless, it will be understood that modifications may be made without departing from the spirit and understanding of this disclosure. Accordingly, other embodiments and approaches are within the scope of the following claims.

What is claimed is:

1. A system to transmit information between devices in a network of devices, the system comprising:
an originator device configured to transmit at least restore command messages and clean-up messages to a plurality of devices in a network of devices;
a first device of the plurality of devices configured to receive the restore command message from the originator device and execute a restore of the first device in response to receiving the restore command message from the originator device, the first device further configured to receive the clean-up message from the originator device and transmit an acknowledgement over the network of devices in response to receiving the clean-up message; and
a second device of the plurality of devices configured to execute the restore of the second device in response to receiving the acknowledgement from the first device of the plurality of devices when the second device fails to receive the restore command from the originator device.

2. The system of claim 1 wherein the second device of the plurality of devices is further configured to receive the originator message from the originator device and execute the restore of the second device in response to receiving the restore command message from the originator device.

3. The system of claim 2 wherein the second device of the plurality of devices is further configured to receive the clean-up message from the originator device and transmit the acknowledgement over the network of devices in response to receiving the clean-up message.

4. The system of claim 1 wherein the second device of the plurality of devices is further configured to execute the restore of the second device in response to receiving the acknowledgement from any other device of the plurality of devices when the second device fails to receive the restore command from the originator device.

5. The system of claim 1 wherein the network of devices comprises a mesh network of devices.

6. The system of claim 1 wherein the plurality of devices are capable of at least one of powerline communications and radio frequency (RF) communications.

7. The system of claim 1 wherein a restore comprises a restore to one of a previous state, a pre-determined state, and an initial state.

8. The system of claim 1 wherein the first device of the plurality of devices is configured to retransmit the restore command messages and the clean-up messages.

9. The system of claim 8 wherein the retransmitted message comprises a max hops flag.

10. The system of claim 9 wherein the max hops flag is initially set to three.

11. The system of claim 10 wherein the max hops flag is reset to three minus a value of last message received from an intended recipient of the message.

12. A system comprising:
a network of spatially separated electronic devices, the devices in mutual communication by at least one of wired and wireless communications, and each device comprising a data processor, a memory device, a transceiver, and a digital instruction set stored within the memory device, each device enabled according to a protocol established by the instruction set to process messages carried by received transmissions and to transmit messages;
a first device of the network configured to receive a cleanup message and to transmit an acknowledgement message to a group of devices of the network; and
a second device of the network configured to receive the acknowledgement message from the first device, the second device further configured to execute a restore in response to the acknowledgement message from the first device.

13. The system of claim 12 wherein the network comprises a mesh network.

14. The system of claim 12 wherein each spatially separated electronic device is capable of at least one of powerline communications and radio frequency (RF) communications.

15. The system of claim 12 wherein a restore comprises a restore to one of a previous state, a pre-determined state, and an initial state.

16. A system comprising:
a first device of a network of spatially separated electronic devices, the first device configured to transmit a group command message to a selected group of devices of the network;
a second device of the selected group of devices receiving the group command message from the first device, the second device configured to execute a restore and transmit an acknowledgement message to the first device on response to receiving the group command message; and
a third device of the selected group of devices receiving the acknowledgement message from the second device, the third device configured to execute the restore in response to receiving the acknowledgement message;
wherein the first, second, and third devices are in mutual communication by at least one of wired and wireless communications, each of the first, second, and third devices comprises a data processor, a memory device, a transceiver, and a digital instruction set stored within the memory device, and each of the first, seconds, and third devices is enabled according to a protocol established by the instruction set to process messages carried by received transmissions and to transmit messages.

17. The system of claim 16 wherein the third device failed to receive the group command message from the first device.

18. The system of claim 16 wherein the network comprises a mesh network.

19. The system of claim 16 wherein each spatially separated electronic device is capable of at least one of powerline communications and radio frequency (RF) communications.

20. The system of claim 16 wherein a restore comprises a restore to one of a previous state, a pre-determined state, and an initial state.

* * * * *